April 1, 1969  E. A. MILLER  3,435,504
METHOD OF MAKING TUBE-IN-SHEET METAL PRODUCTS
Filed Dec. 15, 1965
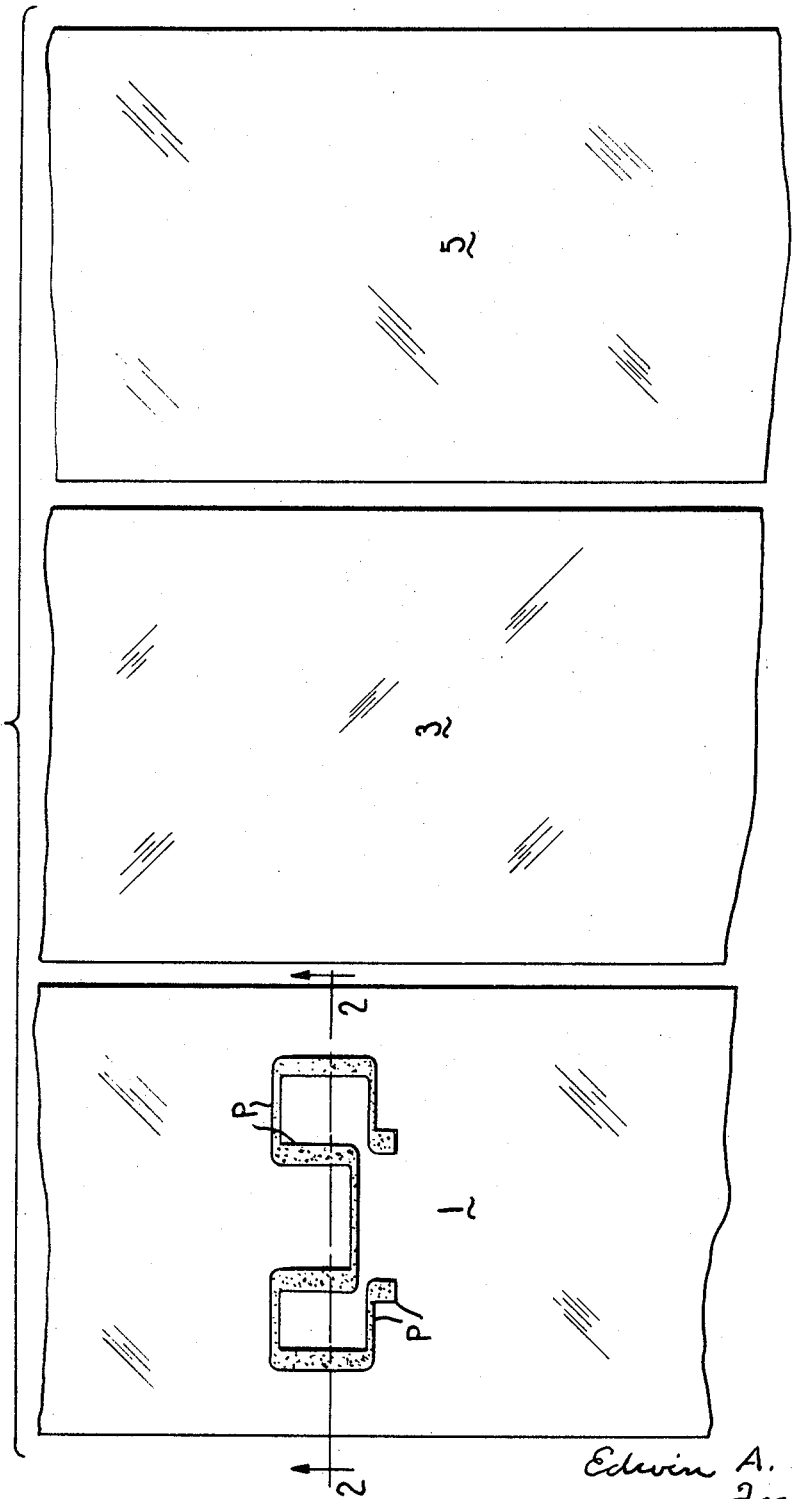
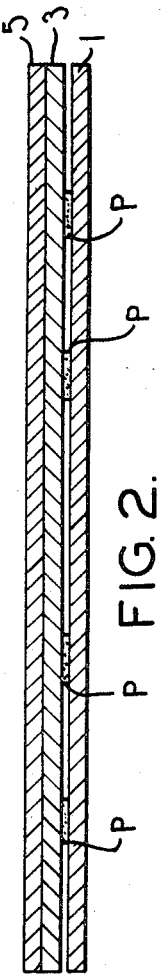
Edwin A. Miller,
Inventor.
Koenig, Senniger, Powers and Leavitt,
Attorneys.

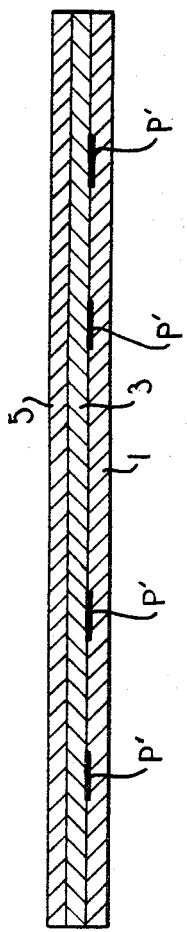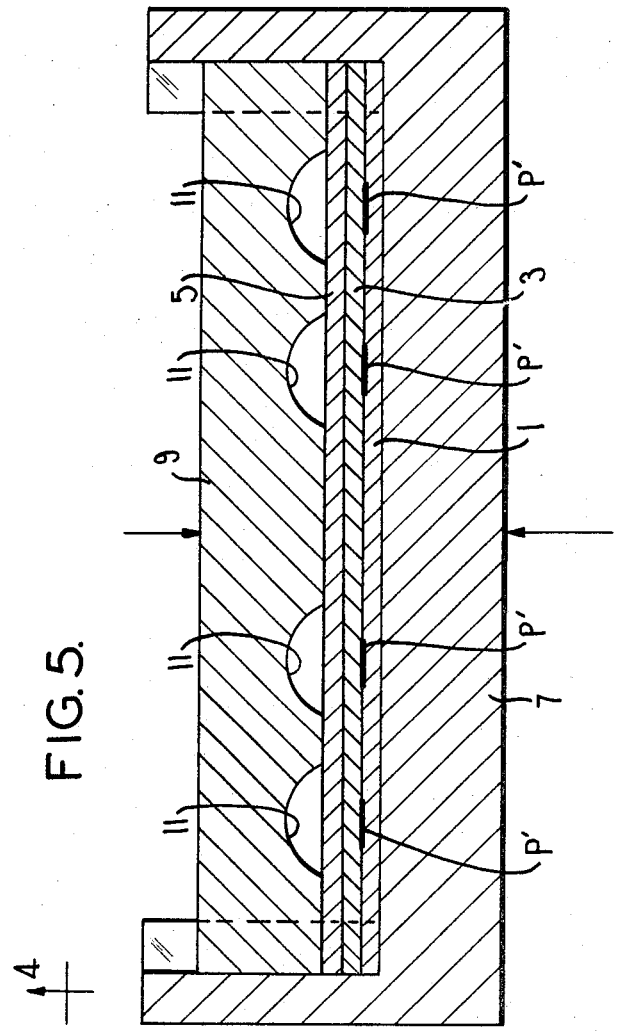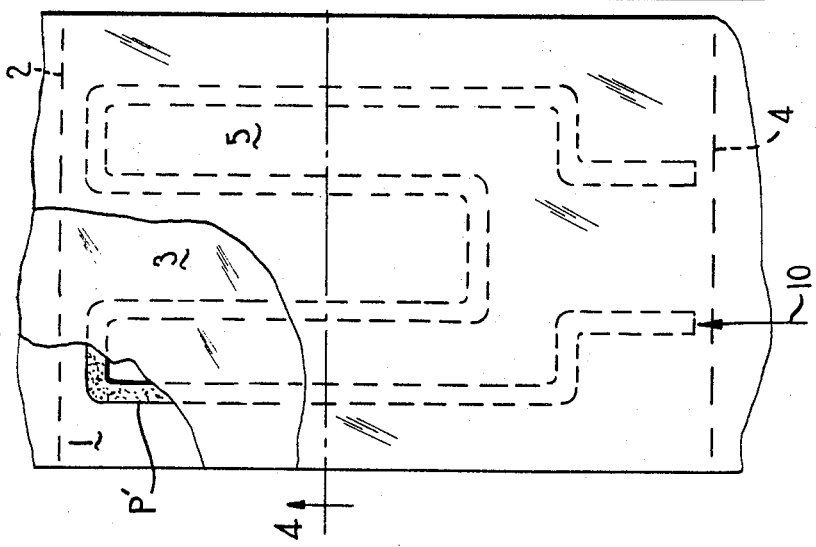

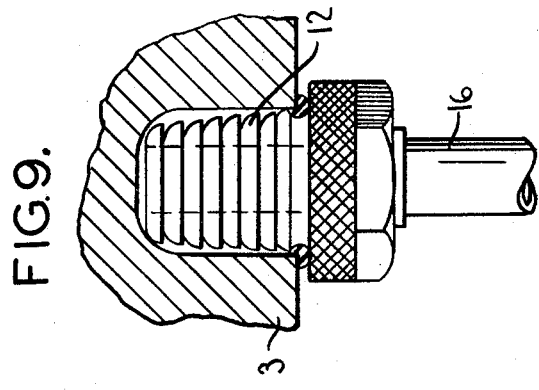
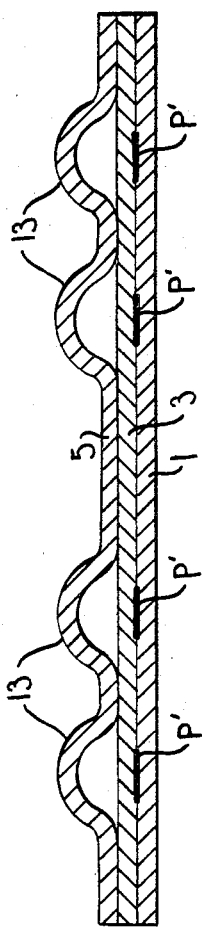
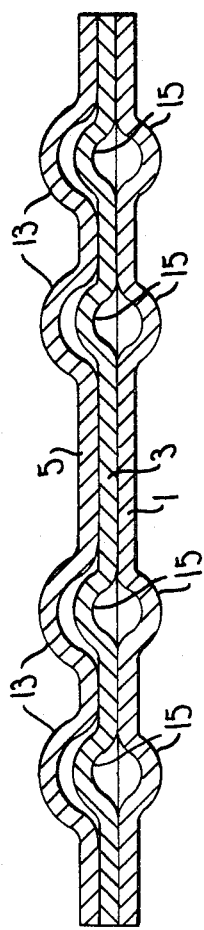
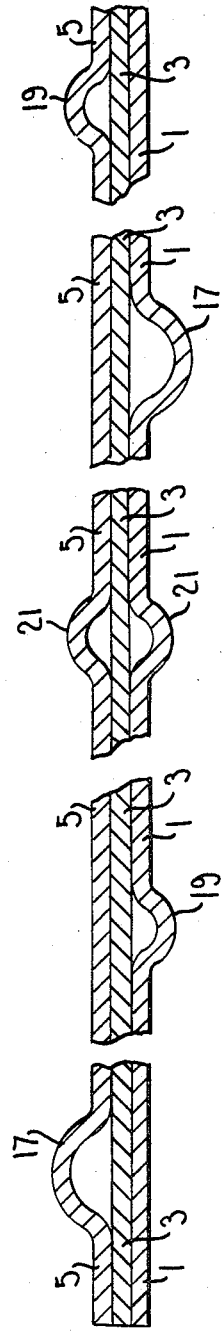

United States Patent Office 3,435,504
Patented Apr. 1, 1969

3,435,504
METHOD OF MAKING TUBE-IN-SHEET METAL PRODUCTS
Edwin A. Miller, Attleboro, Mass., assignor to Texas Instruments Incorporated, Dallas, Tex., a corporation of Delaware
Filed Dec. 15, 1965, Ser. No. 513,993
Int. Cl. B21d 53/00; B23p 15/26
U.S. Cl. 29—157.3                    2 Claims

ABSTRACT OF THE DISCLOSURE

Three sheets of malleable metal such as steel are provided, on one of which is located a foreshortened stop-off pattern of a slurry containing iron oxide particles. The three sheets are stacked and solid-phase green-bonded by rolling under pressure. This has the effect, between the two sheets which sandwich the stop-off pattern, of extending the pattern so that it takes the desired shape. The resulting composite is placed between dies, either or both of which are recessed according to the same or another desired pattern or patterns. Pressure inflation is then performed in the areas under the die pattern or patterns. The pressure-inflated, green-bonded composite is then sintered to improve the nonseparated green bonds. Then the composite is heated in a reducing atmosphere which is absorbed and diffused through the plates and reaches the iron oxide pattern, thereby reducing the oxide to iron with release of steam, the pressure of which inflates the plates in the stop-off pattern.

---

This invention relates to the manufacture of tube-in-sheet metal products useful as heat exchangers and the like, and more particularly to such as are made by inflation.

Among the several objects of the invention may be noted the provision of a composite inflated tube-in-sheet heat exchanger capable of efficient heat exchange between tubing networks for separately circulating fluids on opposite sides of the composite; and the provision of improved methods for manufacturing such heat exchangers by inflation. Other objects and features will be in part apparent and in part pointed out hereinafter. The invention is an improvement upon the inventions disclosed in my United States Patent 3,371,399 based upon application Ser. No. 389,934, filed Aug. 17, 1964, for Inflated Metal Products, and in the United States Patent 3,346,936 based upon application of myself and Robert A. Schultheiss, Ser. No. 389,935, filed Aug. 17, 1964, for Manufacture of Inflated Metal Products.

The invention accordingly comprises the products and methods hereinafter described, the scope of the invention being indicated in the following claims.

In the accompanying schematic drawings, in which several of various possible embodiments of the invention are illustrated.

FIG. 1 is a fragmentary view in plan, illustrating certain malleable metal sheets in strip form prepared for stacking and subsequent operations;

FIG. 2 is a cross section showing the strips of FIG. 1 stacked and ready for solid-phase green-bonding by rolling under pressure, the location of the cross section before stacking being on line 2—2 of FIG 1;

FIG. 3 is a plan view showing the strips of FIG. 2 after rolling under pressure and solid-phase green-bonding;

FIG. 4 is an enlarged cross section taken on line 4—4 of FIG. 3;

FIG. 5 is a cross section showing a typical application of holding dies to the FIG. 4 assembly;

FIG. 6 is a cross section of the assembly of FIGS. 4 and 5 after inflation;

FIG. 7 is a view similar to FIG. 6, after additional inflation;

FIG. 8 is a cross section illustrating various other modifications; and

FIG. 9 is an enlarged detail view illustrating a so-called inflation needle.

Corresponding reference characters indicate corresponding parts throughout the several views of the drawings. For clarity, the thicknesses of thin parts are exaggerated in the drawings.

Hereinafter the term sheet will be understood to comprehend plates, strips or other areas of metal useful for carrying out the invention. The term metals includes their alloys.

Tube-in-sheet heat exchangers have been manufactured in two-layer form. According to the present invention, such sheets may be coveniently constructed in forms of at least three layers which make possible the use in one composite tube-in-sheet structure of more complexly related fluid circuits. Such composite sheets may be expeditiously constructed by properly combining the methods set forth in said patent applications, as hereinafter described.

Referring now more particularly to FIG. 1, there are shown at numerals 1, 3 and 5 sheets in the form of strips of any two malleable metals capable of being solid-phase bonded by processes such as described, for example, in Boessenkool et al. Patents 2,691,815 and 2,753,623. These strips may, for example, be SAE 1006 steel, .070 inch thick, 10 inches wide and received in indefinite lengths from suitable coils of the same. It is to be understood, however, that other metal strips may be employed and they may be composed of the same or different metals.

Solid-phase bonding processes such as described in said Patents 2,691,815 and 2,753,623 call for careful cleaning of the faces of sheets such as 1, 3 and 5 which are interfacially to be bonded. After such cleaning, and according to the present invention, there is imprinted or otherwise applied (on the clean face of strip 1, for example) a linearly contracted or foreshortened, resist or stop-off pattern as illustrated at P. While there are various ways in which the imprint may be made, application by the silk screen process is at present preferred. When sheets 1, 3 and 5 are of steel or other ferrous alloys the material composing the imprint is preferably a water slurry of iron oxide particles. The slurry or paste may be prepared for silk screening by ball-milling to obtain a good dispersion in water of the iron oxide ($Fe_2O_3$) particles. Such particles, for example, constitute 60% of the solid content of the oxide-water mixture. The inclusion of a silicone material in the slurry is in some cases advantageous. Other methods of application beside silk screening are by offset roll printing, stencil spraying or application of a suitable lacquer followed by dusting on of the oxide particles in the desired amount. If desired, part of a pattern may be applied to strip 1 and part to strip 3, or mirror images of the same pattern may be placed on each of these strips for later registration with one another.

After imprinting, the clean face of the strip 3 is applied to the clean face of the strip 1, so as to sandwich the imprinted pattern P therebetween as illustrated in FIG. 2. Further, as illustrated in FIG. 2, the clean strip 5 is applied on top of clean strip 3.

The stacked strips 1, 3 and 5 (FIG. 2) are then green-bonded throughout their interfacial areas not occupied by the print P. This is accomplished by passing the strips through compression rolls of a rolling mill so as to squeeze the strips and reduce their thicknesses while pressing their faces together to establish solid-phase green bonds according to the patents above-mentioned. For the example of strips above given, an approximately 70% reduction in their thicknesses may be employed. Reduction occurs in the solid phase of the metal being bonded. The reduction has the effect of green-bonding the strips while elongating or stretching them, in the direction of their lengths. Only inconsequential transverse stretching will occur. It is for this reason that the pattern P as imprinted is foreshortened only in the direction of the lengths of the strips.

The result of the above-described reduction by rolling has the effect of stretching pattern P (FIG. 1) to P' (FIG. 3) and green-bonding the entire faces of strips 1 and 3 not occupied by the pattern P'. It also has the effect of green-bonding the strips 3 and 5 together. The final linearly extended configuration of pattern P' is as shown in FIG. 3. At the approximate 70% reduction, a ratio of length of shape P to shape P' may for example be about 3.32:1.

At this stage it may be desirable, although not always necessary, that the green-bonded strips (FIG. 4) be heat-treated to effect a partial bond improvement, as for example by heating at 900° F. to 1000° F. for one to two hours or so. This also has the effect of achieving a softening of the strips to aid the malleability for full inflation. Whether or not this heating step is required depends upon the degree to which green-bonding has occurred and/or the requirement for softening. In any event, the bond at this stage should not be too strong, for reasons which will appear. The partially improved or simply green-bonded composite strip 1, 3, 5 is cleaned and then roll-finished to become flat and straight. It is then segmented or cut into lengths, as suggested by the dotted lines 2 and 4 on FIG. 3. The resulting rectangular composite is then placed, for example, between matrix dies 7 and 9. In this example, die 7 is flat, whereas die 9 includes appropriate matrix-forming recesses 11 according to a pattern which may be the same as or different from the pattern of the oxide P'. In the present example, the pattern will be considered to be generally the same.

A nipple of a so-called inflation needle 12 (FIG. 9) is forced in between the sheets 3 and 5 as at arrow 10 on FIG. 3; or this may have occurred prior to inserting the composite (1, 3, 5) between the dies. The nipple 12 is connected to the end of a line 16 of a hydraulic pressure system. While the composite is between the dies 7 and 9, hydraulic pressure is admitted from lines 16 through the nipple and in between sheets 3 and 5 under the recessed matrix pattern 11 of the die 9. The inflating action separates the weakly bonded sheet walls 3 and 5 in the areas of the desired pattern, with the result illustrated in FIG. 6. The flat holding portions of the dies 7 and 9 prevent the green bond from breaking elsewhere. In the resulting construction illustrated in FIG. 6, there results an inflated tubular form 13 between sheets 3 and 5. It will be understood that pressure is released after the inflation has occurred and before removal of the composite (1, 3, 5) from between the dies. The nipple 12 is also removed.

Next the composite in the form shown in FIG. 6 is placed in a furnace for sintering, so as substantially to improve the bond strength above that of the partially improved green bond. For example, sintering may be accomplished in a furnace at 1200° F. for two hours, or at 1700° F. for 10 minutes. For longer periods in the furnace the temperature may be reduced, for example, as low as 800° F. If required for surface protection, a protective atmosphere may be employed in the furnace. This heating converts the comparatively weak green bonds outside of the tubulation into strong solid-phase bonds. This also produces strong solid-phase bonds in the areas between sheets 1 and 3 not occupied by the oxide pattern P'.

Next the composite is heated for approximately 10 minutes at 1800° F. in a furnace containing hydrogen, constituting a reducing atmosphere. Dissociated ammonia gas may also be used which has a substantial hydrogen content. Such a hydrogen-rich atmosphere is capable of diffusing through most metals, including steel, and in doing so comes into contact with the iron oxide forming the bond-resistant pattern P'. Thus the hydrogen diffuses through SAE 1006 steel and reduces the oxide to form iron, with concomitant release of steam the pressure of which builds up due to its entrapment. The resulting pressure separates or inflates the strips in the area of P'. The amount of inflation depends upon time and temperature and is therefore controllable so that a tubular form may be produced such as shown at 15 in FIG. 7. It is preferable that the amount of oxide in the slurry forming the pattern shall be such as to be completely reduced when the desired shape is reached. The reduced iron diffuses into the steel walls within the inflation, thus producing a clean interior in the tubulation. This is sealed from outside contamination until such time as the product is fabricated into an assembly and appropriate fittings installed for circulating appropriate fluids therethrough.

As will be seen from FIG. 7, the tubulation 15 tends to separate the sheets 1 and 3 symmetrically. This forces a part of this tubulation into the tubulation 13 separating sheets 3 and 5. Therefore, in designing a die such as 9, account must be taken of this in order to provide the desired final cross section for fluid flow through the tubulation 13.

It will be understood that the patterns for die inflation and oxide inflation need not be coextensive, which by way of example is illustrated in FIG. 8. This figure also illustrates that a die-inflated tubulation may be formed on either or both sides of the central plate 3 (see tubulation 17). FIG. 8 also illustrates that oxide-inflated tubulations may be effected on both sides of the strip, as illustrated at 19. It will be seen that in this case the oxide inflation will bulge substantially only one plate because of the reaction due to the steam pressure being taken and resisted by two plates. When oxide inflation as illustrated at 21 occurs according to the same pattern on both sides of the plate 3, a symmetrical result is obtained because of the balanced oxide-inflating action (see the middle section of FIG. 8).

It will be understood that when die inflations are to be accomplished on opposite sides of the central plate 3, these may be accomplished simultaneously by connecting the appropriate number of needles 12 required, with a common source of pressure through appropriate lines such as 16.

It will be seen that by employing the oxide-inflation method of producing inflation, it is possible to have a portion of one tubulation in another, as illustrated in FIG. 7.

In view of the above it will be seen that the several objects of the invention are achieved and other advantageous results attained.

As various changes could be made in the above products and methods without departing from the scope of the invention, it is intended that all matter contained in the above description or shown in the accompanying drawings shall be interpreted as illustrative and not in a limiting sense.

What is claimed is:

1. The method of manufacturing a tube-in-sheet structure, comprising applying a metallic oxide pattern to at least one of three clean malleable metal sheets, stacking the sheets with the oxide pattern between a first pair of them, squeezing and solid-phase green-bonding the sheets one to another, inserting the stacked sheets between dies at least one of which carries a recessed matrix pattern, inflating another pair of the sheets between the dies in the region of said matrix pattern to form a first inflation, removing the composite sheets from the dies, heating them substantially to improve the metallurgical bond therebetween, and subjecting them to a heated reducing atmosphere to reduce the oxide to form an expansive medium to inflate the first pair of sheets according to said oxide pattern to form a second inflation.

2. The method according to claim 1 wherein at least portions of the oxide and matrix patterns are coextensive in plan whereby at least a part of the second inflation is located in the first inflation.

References Cited

UNITED STATES PATENTS 2,766,514  10/1956  Adams _____ 29—470.9 X
2,990,608  7/1961   Manning _____ 29—470.9 X
3,045,330  7/1962   Johnson et al. _____ 29—157.3
3,271,846  9/1966   Buechele et al. _____ 29—157.3
3,346,936  10/1967  Miller et al. _____ 29—157.3
3,371,399  3/1968   Miller _____ 29—157.3

JOHN F. CAMPBELL, *Primary Examiner.*

D. C. REILEY, *Assistant Examiner.*

U.S. Cl. X.R.

29—421, 470.9